May 24, 1932.    F. YARDLEY    1,860,004
CHECK VALVE
Filed March 19, 1930

Inventor
Farnham Yardley
By Ritter, Mechlin & O'Neill
Attorneys

Patented May 24, 1932

1,860,004

UNITED STATES PATENT OFFICE

FARNHAM YARDLEY, OF WEST ORANGE, NEW JERSEY, ASSIGNOR TO JENKINS BROS., OF NEW YORK, N. Y., A CORPORATION OF NEW JERSEY

CHECK VALVE

Application filed March 19, 1930. Serial No. 437,212.

The invention relates to certain improvements in check valves of the general type shown in Letters Patent No. 1,828,697, dated October 20, 1931, including a floating guide plate traversed by the valve stem and held in movable engagement with a flange on the casing, the new construction comprising a unitary casing having an internal flange that is notched to permit the guide plate to be engaged readily with the flange and to be removed with the valve for necessary inspection and repair, and guard lugs on each side of the notch to prevent accidental displacement of the guide plate.

The invention is illustrated in the accompanying drawings, in which:—

Figure 1:
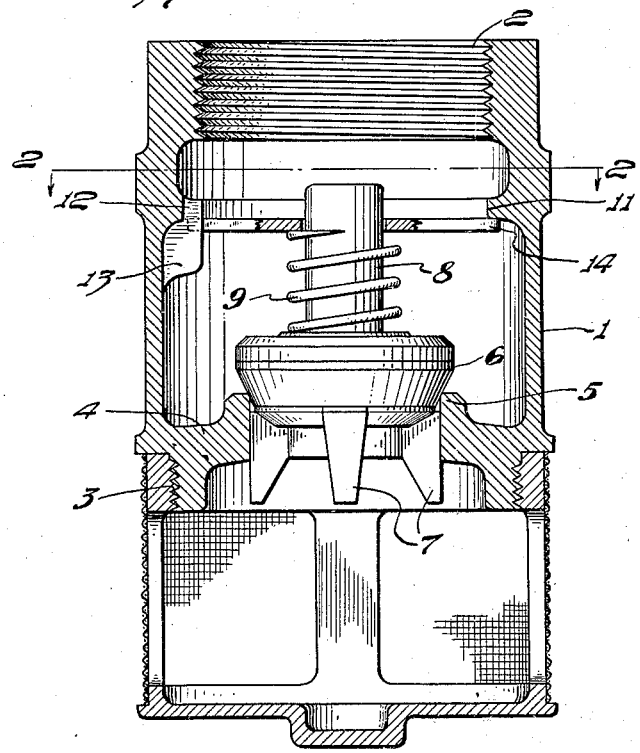
Fig. 1 is a sectional elevation of the valve.
Figure 2:
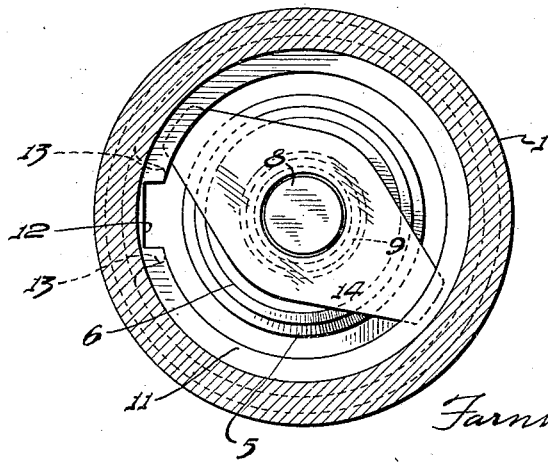
Fig. 2 is a horizontal section on line 2—2 of Fig. 1.

In my prior application aforesaid, I have shown and described a particular form of check valve in which the upper guide member is constituted by a floating plate having a central perforation which is traversed by the stem on the upper face of the valve, the guide plate engaging a flange on the interior of the casing and being held in such engaging relation, with capability of limited lateral movement, by means of the spring which normally tends to seat the valve.

The present invention is designed to simplify the construction of valves of this type and to provide a special means to prevent the accidental displacement of the movable parts of the valve, including the guide plate. Referring to the drawings, 1 indicates the valve body or casing which is substantially cylindrical and is formed as a unitary casting having a transverse valve seat 4 with the usual beveled edge perforation or valve opening. The upper portion of the casing is screw threaded, as at 2, to permit the casing to be attached to the apparatus with which the check valve is associated, such, for example, as a pump or the like. As shown, the lower portion of the valve casing is externally screw threaded, as at 3, to receive a removable strainer element. The valve disk includes the body portion 6, which is of the general type shown in my prior application aforesaid, and is provided with guide lugs or feathers 7 on its lower portion, which engage the inner peripheral surface of the opening through the valve seat. Extending from the upper portion of the valve body is the stem 8, which is surrounded by a helical spring 9. Formed interiorly of the valve casing is an inwardly extending flange 11, which is provided with a notch 12 at one side, the notch being flanked on each side by downwardly extending integral lugs 13.

The floating guide member 14 is of the same general type as that shown in my application aforesaid, including a plate having a central perforation through which the valve stem 8 passes, the plate having ends which are adapted to pass through the notch 12, when the plate is being applied to its abutting relation beneath the inwardly extending flange 11, as indicated in Fig. 1. This is effected by first engaging one end of the plate under the flange and passing the other end of the plate through the notch and depressing said ends sufficiently to clear one of the guard lugs 13 and partially rotating the plate until it passes the lug, after which the plate will be snapped into position by the spring and will be retained against accidental displacement by the guard lugs, but will nevertheless be susceptible of limited movement with respect to the abutting flange to permit the valve disk to be properly engaged by its seat under all conditions of operation.

As indicated, the new form of valve involves all of the advantages and utilities of the valve shown in my prior application aforesaid, with the additional advantages that the body or casing may be formed as a single integral casting to which the valve and its associated elements, including the spring and the guide plate, may be applied or removed with facility, and the guide plate will be preserved against accidental displacement.

What I claim is:

1. In a check valve having a floating guide plate for the valve stem engaging an interior flange on the casing and capable of limited lateral movement within the casing, said flange having a notch formed therein to permit the passage of one end of the guide plate and guard lugs on each side of the notch to prevent accidental disengagement of the plate and flange.

2. A check valve structure comprising an integral casing having a valve seat and an interior flange above the seat provided with a notch, guard lugs on each side of the notch, a valve disk having guide members on the lower side cooperating with the seat opening and a stem on its top, a spring surrounding the stem, and a guide plate having a central opening engaged by the stem, said plate being held in engagement with said flange by the spring and capable of limited lateral movement within the casing, and having an end adapted to be passed through the notch in the flange and behind the guard lugs.

3. A check valve comprising a casing having a valve seat and an interior flange above the seat provided with a notch flanked by guard lugs, a valve disk having guide members engaging the valve seat opening and a stem on its top, a spring surrounding the stem and a floating guide plate traversed by the valve stem and held in movable engagement with the flange by the spring and capable of limited lateral movement within the casing, said guide plate having one end at least of a width to pass through the notch, said guard lugs preventing accidental registry of the end of the plate with the notch.

In testimony whereof I affix my signature.

FARNHAM YARDLEY.